US012637097B2

(12) United States Patent
Wang

(10) Patent No.: US 12,637,097 B2
(45) Date of Patent: May 26, 2026

(54) METHOD FOR ASSISTING A USER OF AN ASSISTANCE SYSTEM, ASSISTANCE SYSTEM AND VEHICLE COMPRISING SUCH A SYSTEM

(71) Applicant: Honda Motor Co., LTd., Tokyo (JP)

(72) Inventor: Chao Wang, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 699 days.

(21) Appl. No.: 17/365,983

(22) Filed: Jul. 1, 2021

(65) Prior Publication Data

US 2022/0001889 A1 Jan. 6, 2022

(30) Foreign Application Priority Data

Jul. 3, 2020 (EP) ..................................... 20183897

(51) Int. Cl.
| | |
|---|---|
| *G05D 1/00* | (2024.01) |
| *B60K 35/22* | (2024.01) |
| *B60K 35/28* | (2024.01) |
| *B60K 35/80* | (2024.01) |
| *B60W 50/14* | (2020.01) |

(Continued)

(52) U.S. Cl.
CPC ............. *B60W 50/14* (2013.01); *B60K 35/22* (2024.01); *B60K 35/28* (2024.01); *B60K 35/80* (2024.01); *B60K 35/10* (2024.01); *B60K 35/29* (2024.01); *B60K 2360/119* (2024.01); *B60K 2360/179* (2024.01); *B60K 2360/191* (2024.01); *B60W 2050/146* (2013.01); *B60W 2554/40* (2020.02)

(58) Field of Classification Search
CPC .................................................... B60W 50/14
See application file for complete search history.

(56) References Cited

U.S. PATENT DOCUMENTS 9,690,104 B2 6/2017 Kim
10,488,218 B2 11/2019 Kim et al.
(Continued)

FOREIGN PATENT DOCUMENTS

DE 102016225346 6/2018
EP 3505383 7/2019
(Continued)

OTHER PUBLICATIONS

"Search Report of Europe Counterpart Application", issued on Dec. 11, 2020, p. 1-p. 7.

*Primary Examiner* — Vivek D Koppikar
*Assistant Examiner* — Paul W Arellano
(74) *Attorney, Agent, or Firm* — JCIPRNET

(57) ABSTRACT

The invention regards an assistance system and a method for assisting a user of such an assistance system including a display displaying representations of one or more objects in the environment of the display. In a first step, information on an environment of the display, is determined and presence of objects in the environment is determined. Then, a representation of the environment including representations of the objects determined in the environment is generated. For at least one of the determined and displayed objects, a starting point for an indicator line is calculated from a direction of the object relative to the display, and, for each determined starting point, an indicator line connecting the starting point with the displayed representation of the real world object is drawn.

4 Claims, 5 Drawing Sheets

(51) Int. Cl.
        *B60K 35/10*          (2024.01)
        *B60K 35/29*          (2024.01)

(56)                    References Cited

U.S. PATENT DOCUMENTS

2001/0039471 A1*  11/2001  Bienias ................. G01S 13/931
                                                                701/96
2009/0070709 A1*   3/2009  Engel ...................... G01D 7/00
                                                                715/790
2010/0134519 A1*   6/2010  Yamada ................... B60R 1/27
                                                                382/104
2018/0178811 A1*   6/2018  Ohta ...................... G08G 1/167
2018/0240258 A1*   8/2018  Kosaka ................. B60W 50/14
2019/0230309 A1*   7/2019  Asayama ................. G06T 7/50

FOREIGN PATENT DOCUMENTS

EP              3570225       11/2019
JP            2015172548      10/2015

* cited by examiner

METHOD FOR ASSISTING A USER OF AN ASSISTANCE SYSTEM, ASSISTANCE SYSTEM AND VEHICLE COMPRISING SUCH A SYSTEM

CROSS-REFERENCE TO RELATED APPLICATION

This application claims the priority benefit of European application serial no. 20183897.6, filed on Jul. 3, 2020. The entirety of the above-mentioned patent application is hereby incorporated by reference herein and made a part of this specification.

TECHNICAL FIELD

The invention regards a method for assisting a user of an assistance system in perceiving an environment and a respective assistance system, in particular an advanced driver assistance system of a vehicle.

BACKGROUND

In order to improve safety for traffic participants, a large variety of assistance systems has been developed over the last years. The systems usually use sensors for physically sensing the environment of the system, for example, the environment of a vehicle. In order to assist the user, the systems generate a representation of the environment. In many cases, the systems are designed to generate behavior suggestions based on the representations. Other approaches are only intended to improve the environment perception by the user. These systems display the environment representations by displaying objects that are sensed in the environment of the display, which is held by the user or mounted on a vehicle that is operated by the user. Often, sensed objects or related information is displayed using augmented reality displays. Such approaches are, for example, known from U.S. Pat. No. 9,690,104 or EP 3570225 A1.

One problem of the known systems is that the user, unless the system is designed for fully automated driving, still needs to observe the environment himself. Even in level 2 automated systems, the driver still needs to observe the surroundings and the status of the vehicle in case of abnormal situations. Thus, adding additional information to what the user needs to perceive in the environment anyway, will lead to an increased amount of information. Perceiving details of the environment that are necessary to take the correct decisions for safely participating in a dynamic environment such as dense traffic is a demanding task. Thus, simply adding information that additionally needs to be perceived by the user may even cause distraction of the user and, thus, may rather be detrimental to the desired effect of improving safety.

It is to be noted that the problem is not limited to assistance systems where a driver necessarily needs to align the real-world with representations on a display. Event navigation systems can use sensed outside information to enhance the realistic impression which automatically leads to the driver, or a user of such a system in general, trying to identify real-world objects with the corresponding representations on the display. It is thus an object of the present invention to alleviate perception of the environment of the user by indicating a correspondence between objects in the environment (real-world objects) of the assisted user which are included as icons in the representation used in the assistance system.

SUMMARY

This object is achieved by the method according to the invention, the assistance system and a corresponding vehicle including such an assistance system.

According to the invention, the method for assisting a user of an assistance system including a display displaying one or more icons corresponding to (or images of) objects in the environment of the display at first obtains information on an environment of the display, which is the environment of the vehicle in case that the display is mounted on the vehicle. Presence of objects in the environment is determined using sensors and a representation of the environment including the objects determined in the environment is displayed on the display. Then, a starting point for an indicator line is determined from a direction of the object relative to the display for at least one of the determined and displayed objects. Finally, for each determined starting point, the indicator line connecting the starting point with the displayed object is displayed. The inventive assistance system comprises a display, respective sensors and a processing unit that is configured to carry out the method steps explained above.

The general idea of the present invention is that a user of an assistance system will easily recognize information on the environment which is displayed of the display, when the user can easily identify objects in the environment of the display with respective icons (images) as representations of the objects on the display. Consequently, the time needed by the user to align the information perceived directly from observing the environment and information given by the display is reduced. This results in a user's improved understanding of the overall situation and, in the end, reduces errors that are made by the user. In case that such an assistance system is dedicated to assist a person participating in traffic, for example, when operating a vehicle in which such an assistance system is mounted, this will leads to increased safety.

The dependent claims define advantageous embodiments of the method and assistance system.

According to one preferred embodiment, the starting point is calculated as a point of intersection between an outer edge of the display and a surface area extending from a vertical axis through a reference point of the display and including a direction vector pointing from the reference point towards the real world object for which the indicator line shall be displayed. Identifying a starting point and displaying an indicator line as explained above allows the user to intuitively identify the objects in the real world in the environment of the vehicle with the corresponding object representations (icons, images) on the display. Having the starting point located at the edge of the display in a very intuitive manner combines the real world objects with the representation on the display. Thus, it is easily possible for the user to identify real-world objects with corresponding icons or simplified object representations on the display.

The identification of objects in the real world environment of the assistance system with the represented objects on the display is further improved when the $3o$ direction vector is calculated so as to point from the reference point in the display to a center of the determined object.

Further improvement is achieved, if, for at least one determined and displayed object, an indicator bar corresponding to a perceivable horizontal extension of the determined object is displayed along the outer edge of the display, wherein the indicator bar includes the starting point. This is particularly helpful, if the indicator line itself may be ambiguous because there is a plurality of objects in the real world.

The indicator bar allows to directly recognize horizontal dimensions of the object in the real world which gives the user of the assistance system a further indication of a correspondence between the real world object and its representation on the display.

Preferably, the indicator bar extends from a first intersection point of the edge of the display and a first boundary surface area to a second intersection point of the edge of the display and a second boundary surface area, wherein the first boundary surface area extends from the vertical axis through the reference point and includes a first direction vector pointing from the reference point towards a first outermost perceivable boundary of the determined object in the horizontal direction and the second boundary surface area extends from the vertical axis through the reference point and includes a second direction vector pointing from the reference point towards an opposite, second outermost perceivable boundary of the determined object in the horizontal direction. Since the ends of the indicator bar are defined by a first intersection point and a second intersection point, which are determined in a similar way as the starting point, it is intuitively recognized by the user like a projection of the real world objects onto the display.

According to an advantageous aspect and in case of coincidence of boundary surfaces of two determined objects, directly adjacent indicator bars are displayed using distinguishable characteristics. Thus, even if one of the objects in the environment of the display or the assistance system is partially occluded by another object, and both objects are displayed in the representation, the arrangement of the indicator bars having distinguishable characteristics allows easy determination which indicator bar belongs to which real-world object. It is to be noted that a horizontal extension of an occluded object is assumed to be limited by the horizontal extension of the occluding object. Thus, necessarily, in case of partially occluded objects, the rightmost surface area of the one object coincides with the leftmost surface area of the other object, or vice versa. The characteristics may particular include colors, brightness or patterns of the indicator bars.

The assistance system according to the invention comprises a display, controlled by a processing unit configured to obtain information on an environment of the display sensed by sensors, determine presence of objects in the environment, and to cause the display to display a representation of the environment including the objects determined in the environment, and to determine for at least one of the determined and displayed objects, a starting point for an indicator line from a direction of the object relative to the display, and to cause the display to display, for each determined starting point, the indicator line connecting the starting point with the representation of the object.

In case that additionally indicator bars shall be displayed, the processing unit is further configured to cause the display to display for at least one determined and displayed object an indicator bar corresponding to a perceivable horizontal extension of the determined object along the outer edge of the display, wherein the indicator bar includes the starting point.

BRIEF DESCRIPTION OF THE DRAWINGS

Further aspects and details will now be explained with reference to the annexed drawings in which.

DETAILED DESCRIPTION

Figure 1:
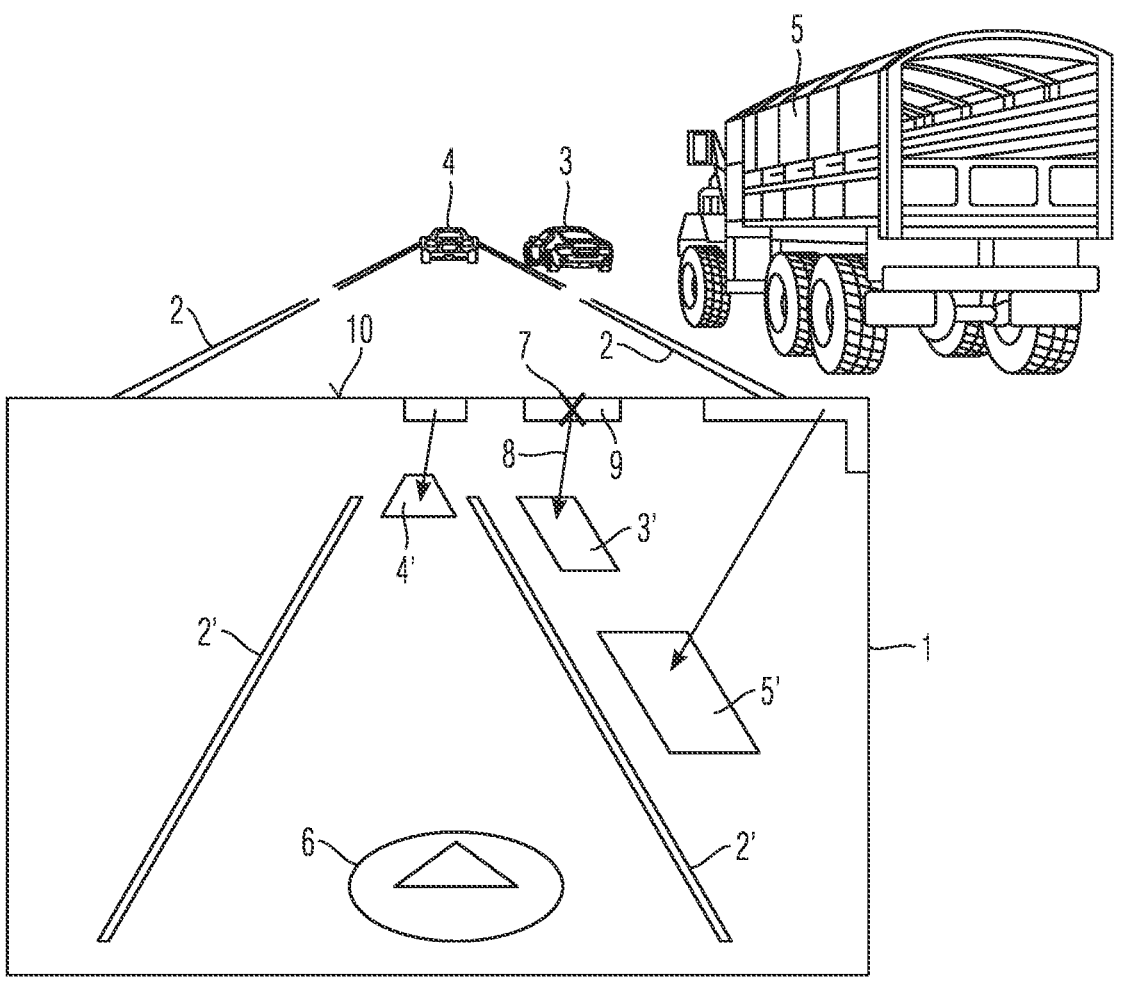
FIG. 1 is an illustration for explaining the resulting display allowing to easily recognize the correspondence between real-world objects and their representation on the display.

In FIG. 1, shows a display 1, on which a representation of an environment of the display 1 is displayed. The environment of the display 1 is sensed by one or a plurality of sensors. Based thereon, a processing unit calculates the representation to be displayed from the sensor signals. Typically, such displays 1 are mounted on a vehicle, the driver of which shall be assisted in perceiving the environment and thus taking the right decisions in order to safely drive the vehicle. For the following explanations it shall be assumed that the display 1 is mounted in such a vehicle and is part of an advanced driver assistance system.

For simplicity of the drawings only the display 1 of the vehicle is shown, because vehicles comprising driver assistance systems including such displays are readily known in the art.

In the situation illustrated in FIG. 1, which is used for explaining the functioning of the inventive method and assistance system, a plurality of vehicles can be perceived in the environment of display 1. It can be gathered from FIG. 1 that the vehicle on which the display 1 is mounted is driving on a certain lane of a road, which is delimited from neighboring lanes by left and right lane markers 2.

On the right neighboring lane, a vehicle 3 can be identified and further a lorry 5 following the vehicle 3. Additionally, on the ego-lane, a further vehicle 4 is driving as a predecessor. Objects that are sensed by the sensors and determined from the sensor signals by postprocessing all the sensor signals are, of course, not limited to vehicles. There are many systems on the market available, which are capable of identifying a plurality of different objects from sensor signals. Sensors may be for example radar sensors, LIDAR sensors, ultrasonic sensors, etc. So identification of objects in signals received from respective sensors is known in the art and an explanation thereof shall be omitted for reasons of conciseness.

The explanations that are giving hereinafter refer to vehicle 3 in order not to limit in any way only to vehicles driving on the same lane as the ego-vehicle. However, the explanations given are valid in the very same way for any object, which can be determined in the environment of the display 1. It is particularly to be noted, that the following explanations all refer to vehicles, as here the advantageous aspects become immediately evident. Perception of moving objects in the environment of a traffic participant is more challenging than identification of static elements. Nevertheless, the invention is applicable for all objects that can be determined in the environment of the display 1.

A sensor, not illustrated in FIG. 1, physically senses the environment of the vehicle and thus the environment of the display 1. From the sensor output, a processor calculates positions of the determined objects in a coordinate system, which has a fixed relation to the display 1. The fixed relation of the display 1 and the sensor to each other is known from the design of the system. Thus, no matter in which coordinate system the positions of objects in the environment are calculated, the positions may be converted into a coordinate system of the display 1. This will be explained in greater detail with reference to FIGS. 2 and 3.

From the sensor output the representation of the environment of the display 1 is calculated. Objects that can be determined from the sensor outputs are displayed as corresponding icons on the displayed 1. Depending on the resolution of the display 1 and the processing performance of the entire system it is also possible to use images representing the real world objects instead of icons. In the example illustrated in FIG. 1, the vehicles 3, 4 and the lorry 5 are shown as gray surfaces 3', 4' and 5'. Additionally, lane markers 2' are shown to indicate the lane on which the ego-vehicle (and also vehicle 4) is driving. The position of the ego-vehicle is indicated by a further icon 6 including an arrow in order to indicate the driving direction of the ego-vehicle.

According to the invention, the user of the assistance system shall be assisted in identifying a correspondence between objects perceivable outside the display 1 in the real world and their corresponding icons displayed on the display 1. In the present case, this will be explained with reference to vehicle 3 as an example.

Based on the sensor output a starting point 7 is calculated by the processor (not shown in FIG. 1). The starting point 7 is calculated to lie on the edge 10 of the display 1. This starting point 7 is then connected with the icon 3' corresponding to the real world object, namely vehicle 3, by drawing an indicator line 8. It is preferred that the indicator line 8 between the starting point 7 and the icon 3' is an arrow with its tip ending inside the gray area of the icon 3'. preferably, As it will be explained hereafter, the position of the starting point 7 on the edge 10 of the display 1 is determined such that the indicator line 8 resembles a direct connection from the real world vehicle 3 to the corresponding icon 3'. As it has been briefly discussed above, the position of the real world vehicle 3 in the coordinate system of the display unit 1, which is the relative position of the vehicle 3 to the display 1, is known.

In addition to the indicator line 8 an indicator bar 9 is displayed on the display 1 in a preferred embodiment. The indicator bar 9 extends along the outer edge 10 of the display 1. The length of extension along the edge 10 of the display 1 corresponds to horizontal dimension of the corresponding real-world object as this dimension is perceivable by a user of the assistance system. This means that for objects that have a greater distances to the display 1 only a shorter indicator bar 9 is displayed on the display 1. The same object being closer to the display 1 would be represented by an indicator bar 9 with larger extension.

Depending on the relative position of the real-world object to the display 1, the indicator bar 9 may extend over a plurality of edges 10 of the display 1, which, for example, may have a rectangular shape. In the illustrated embodiment, this can be seen by the indicator bar in the right upper corner of the display 1 representing the lorry 5. However, as it will be apparent from the following explanations, all calculations determining the starting points 7 and the endpoints of the indicator bars 9 refer to the same reference point on the display 1. This reference point is the center of the icon 6 and is the point at which all axes of the coordinate system intersect. The absolute orientation of the coordinate system of the display 1 is not relevant for the calculation of the starting point 7 and the indicator bar 9 as long as two conditions are fulfilled:

a) one axis has to extend in the vertical direction so that the other 2 span a horizontal plane b) the orientation of the coordinate system is static.

Figure 2:
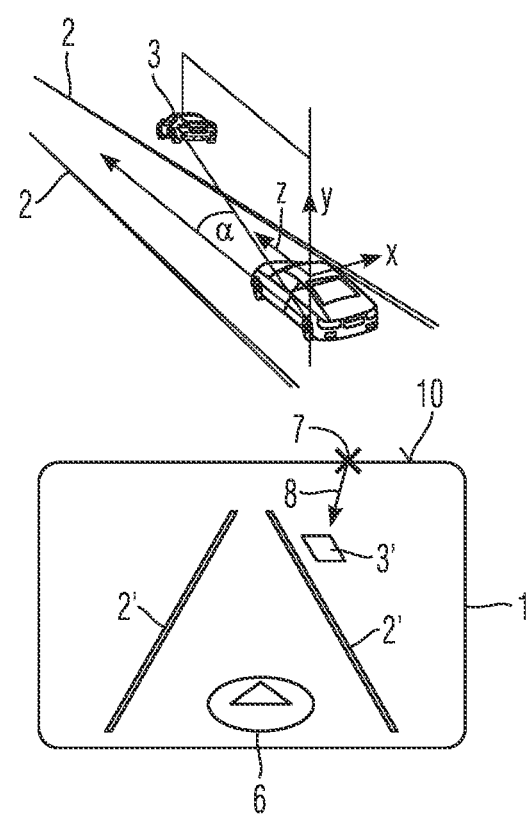
FIG. 2 is a schematic for explanation of the method for defining a starting point for the indicator line.
Figure 3:
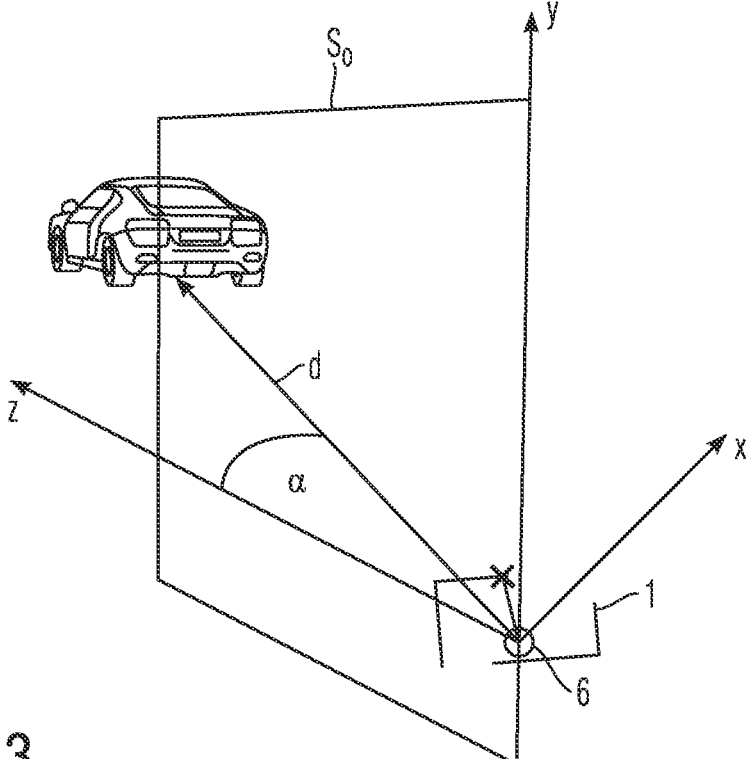
FIG. 3 is an enlarged view of FIG. 2.

For a first explanation of the inventive method, it is now referred to FIG. 2. As indicated above, the explanations are limited to a single environmental object that is sensed by the sensors, namely vehicle 3. Of course, the displayed representation of the environment in FIG. 2 is adapted such that only the icon 3' and the lane markers 2' are shown.

As it can be seen in FIG. 2 it is not absolutely necessary that the indicator line 8 extends to the middle of the surface of the icon 3', but it is sufficient that it unambiguously points at towards icon 3' to allow a user to identify the icon 3' with the respective real-world vehicle 3.

Before the display 1 can output the screen as shown in FIG. 2, it is necessary to determine the position of the starting point 7 on the edge 10 of the display 1. This approach is explained with reference to the upper part of FIG. 2 and the enlarged portion in FIG. 3.

Vehicle 3 has mounted the assistance system of the present invention including at least one sensor allowing to determine the direction in which objects in the environment of the ego-vehicle are located. The position determination may be done in a first coordinate system which is in the present case indicated by the arrow pointing in the driving direction of the vehicle 3. With reference to this coordinate system an angle α is determined. Generally, the position and orientation of the display 1 and the coordinate system used for determining the position of the vehicle 3 have a fixed relation and, thus, the position of the vehicle 3 in the coordinate system of the displayed 1 can be easily determined. For the understanding of the present invention is sufficient to assume that the coordinate system of the sensor and the display 1 coordinate system coincide. It is to be noted, that this assumption is only made for an easy understanding and without limiting the generality.

As mentioned above, the coordinate system of the display 1 is arranged such that all 3 axes of the coordinate system run through the reference point corresponding to the ego-vehicle's position on the display 1, which is the origin of the coordinate system.

Once the direction in which the vehicle 3 is relative to the display 1 is known, a surface area $S_o$ is determined extending from the vertical axis y running through the reference point of the display 1 and including a direction vector d pointing at the vehicle 3.

This surface area $S_o$ intersects with display 1 and, thus, has an intersection point with one edge 10 of the display 1. In order to avoid that the surface area $S_o$ has a second intersection point, the surface area $S_o$ extends only from the vertical axis y in the direction of the direction vector d pointing at the real-world object, vehicle 3. The only requirement that must be fulfilled is that the display 1 and the vertical axis y intersect in one point, meaning that the vertical axis does not lie in the plane of the display 1.

Since the position of the icon 3' is known in advance, and having now determined the position of the starting point 7 on the edge 10 of the display 1, the indicator line 8 can be drawn. For choosing the second end point of the indicator line 8 (tip of the arrow), a plurality of different approaches are possible: first, the indicator line 8 may connect the starting point 7 and the center of the area of icon 3'. Second, the indicator line 8 may extend along an intersection line of the surface area $S_o$ and the display 1. This intersection line necessarily extends from the starting point 7 towards the origin of the coordinate system of the display 1. Assuming that a user of the assistance system intuitively identifies his own position with the icon 6 indicating the ego-vehicle and, thus, with the position of the reference point on the display 1, this gives the most natural approach for easily identifying objects of the real world and the environment of the display 1 with the corresponding icons. The length of the indicator line 8 may, however, be chosen based on design consider- ations, for example, to avoid occluding other objects. Thus, the indicator line 8 may extend to the center of the icon or may only point to the boundary of the icon area.

It is to be noted that for determining the direction vector d, well known image processing techniques may be applied. For example, from the data received from the sensors, an outline of an image of the real-world object in the environ- ment representation can be generated, and the coordinates in the center of an area of such outline can be chosen as a tip will of the direction vector. Other alternatives may be thought of as well.

Figure 4:
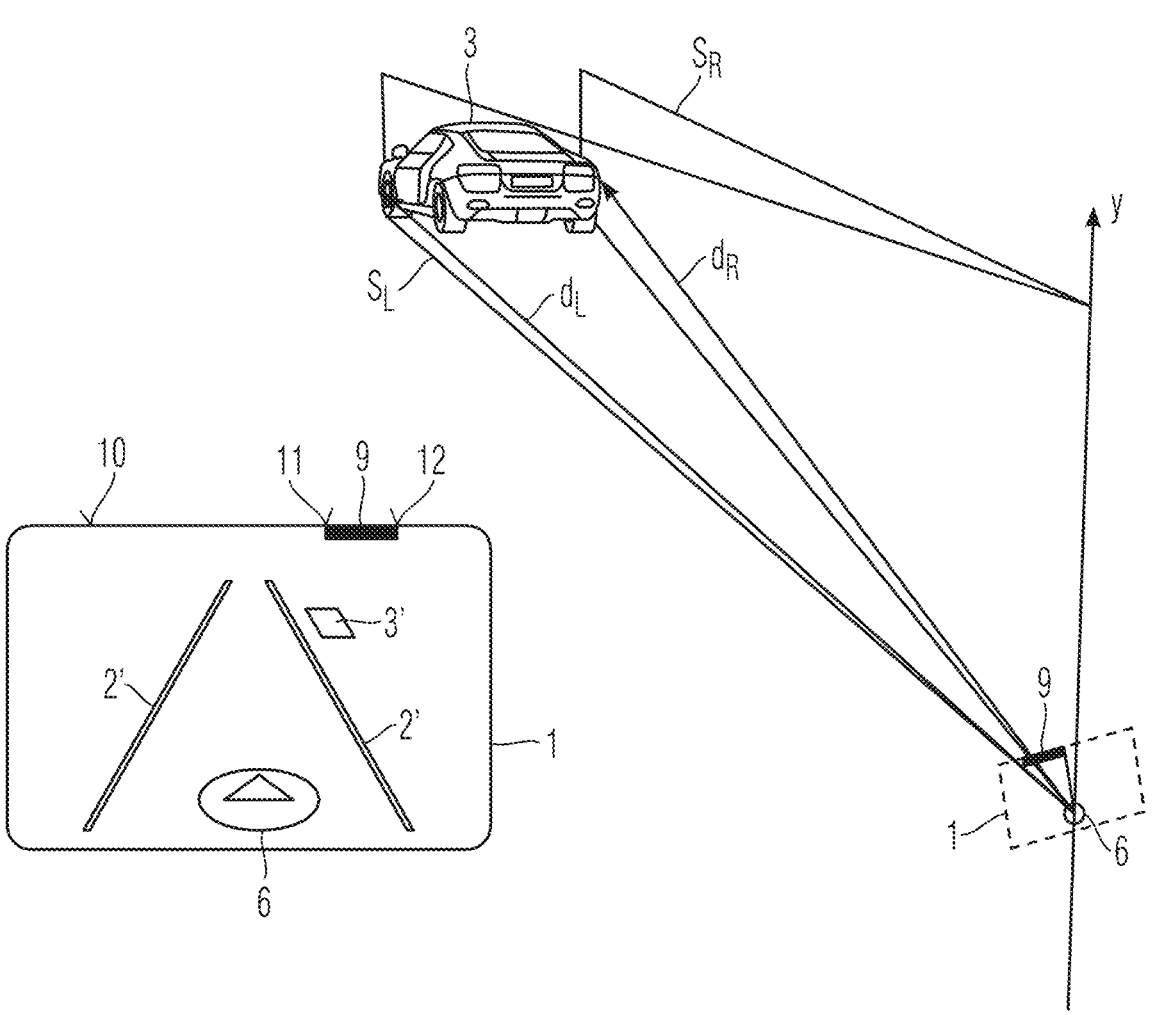
FIG. 4 is an illustration for explaining the method for defining indicator bars corresponding to real-world objects.

In FIG. 4, an advantageous embodiment is illustrated. In addition to the indicator line 8, an indicator bar 9 is displayed for each determined and displayed object: for example, vehicle 3, that is displayed in the representation of the environment on the display 1. For illustrative purposes, the indicator line 8 as well as the surface area $S_o$ used for calculating the starting point 7 are omitted in the drawing.

For determining a first endpoint and a second end point of the indicator bar 9, intersection points 11, 12 of a first surface area $S_L$ a second surface area $S_R$ are determined. The calculation of the intersection points 11, 12 of the first surface area $S_L$ and second surface area $S_R$ with the edge 10 of the display 1 is similar to the calculation of the starting point 7 explained with reference to FIGS. 2 and 3: Again, surface areas $S_L$, $S_R$ are determined based on the vertical axis y of the coordinate system of the display 1 and direction vectors $d_L$, $d_R$. This time, the direction vectors $d_L$, $d_R$ point from the origin of the coordinate system of the display 1 towards a leftmost and rightmost point of the outline of the real-world object. Thus, the resulting indicator bar 9 corre- sponds to a extension of the real-world object in the hori- zontal direction.

Figure 5:
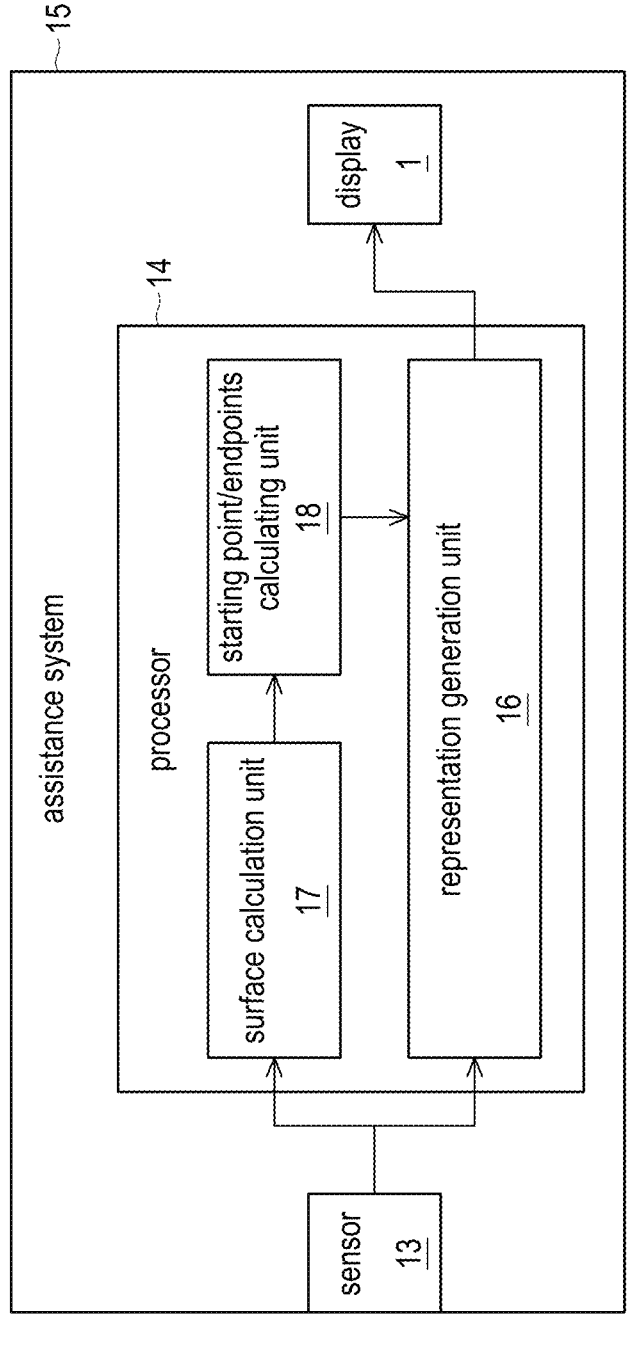
FIG. 5 is a simplified block diagram with the main components of the assistance system according to the invention.

FIG. 5 shows a simplified block diagram having the display 1, one or more sensors 13 and a processor 14 as main components of the inventive assistance system 15. The assistance system 15 will usually be mounted on a vehicle and sensors 13 which are available from other assistance systems of such a vehicle may be used commonly for the different assistance systems.

The sensor output is supplied to the processor 14 which, based on information contained in the sensor signal calcu- lates a representation of the environment in a representation generation units 16. According to the invention, and based on the sensor output too, a surface calculation unit 17 calculates one or more surface areas $S_o$, $S_L$, $S_R$ as explained above and supplies the information on these surfaces to a starting point/endpoints calculating unit 18.

It is to be noted that the units 16, 17 and 18 may all be realized as software modules with the software being pro- cessed on the same processor 14. The "processor" 14 may also consist of a plurality of individual processors that are combined to a processing unit. Further, the coordinates of the display 1 in the coordinate system of the display 1 are known and stored in the assistance system 15. Thus, based on surface areas $S_o$, $S_L$, $S_R$ that are defined in the surface calculation unit 17, it is easy to calculate intersections (intersection points as well as intersection lines) between these surface areas $S_o$, $S_L$, $S_R$ and the surface of the display 1. It is to be noted that whenever the explanations given with respect to the present invention refer to the "display 1", the display surface visible for a user is meant but not the entire display unit.

As it had been explained earlier already, a coordinate transformation may be made in a preprocessing step after the environment of the display 1 has been sensed by the sensors 13. Such a coordinate transformation is necessary only in case that the coordinate system used for the sensors 13 (and thus determination on the relative position of an object in the real world) and the coordinate system of the display 1 is not the same. In case that the position of the sensors 13 and the display 1 are very close, the same coordinate system may be used and conversion of the coordinates becomes unneces- sary.

Figure 6:
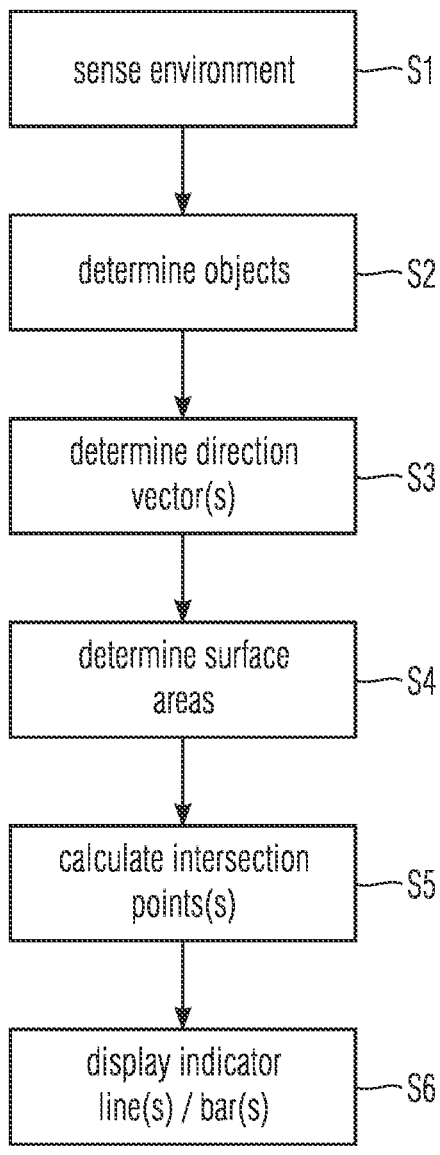
FIG. 6 is a simplified flowchart detailing the method steps according to the invention.

FIG. 6 shows a simplified flowchart illustrating the main method steps according to the invention which have been explained in greater detail above.

First, using sensors, the environment of the display 1 is sensed in step S1. Next, in step S2, objects in the environ- ment are determined from the sensor output. In step S3 direction vectors d, $d_L$, $d_R$ are calculated which point to a center of the objects, or to the extrema in the horizontal direction which identify its leftmost and rightmost boundary of, for example, a traffic object.

In step S4, a surface area $S_o$, $S_L$, $S_R$ is determined for each of the determined direction vectors d, $d_L$, $d_R$. These surface areas are then used in step 5 to calculate intersection points lying on the outer edge 10 of the display 1. Finally, in step S6, for each calculated starting point 7 an indicator line 8 is displayed. In case that pairs of first endpoints and second in points are calculated from the respective surface areas $S_L$, $S_R$, corresponding indicator bars 9 are displayed.

the present invention it is very easy for a user of the display 1 to identify real-world objects with corresponding icons or other illustrations of the real-world objects displayed on the display 1. Thus, the time needed by the user in order to consider all relevant information for successfully and cor- rectly assessing for example a traffic situation in dynamic environments is significantly reduced. A detrimental effect of providing additional information is thus avoided.

The preferred field of application is an integration in advanced driver assistance systems or, more general, assis- tance systems used in vehicles. Such systems could be using onboard mounted sensors and displays. However, stand- alone solutions may also be thought of. For example, a handheld device used for navigation could be equipped with respective sensors so that even such a standalone device could make use of the present invention. The latter could be great improvement of safety for pedestrians which tend to look on their mobile devices when navigating towards an unknown destination. The present invention objects per- ceived in the corner of the eye may easily be identified with the corresponding icons on the display. Even without look- ing up in order to obtain complete information on this specific object in the real world, the pedestrian may make at least a basic estimation regarding the relevance of the respective real-world object.

Specifically the combination of the indicator lines with the indicator bars allow an identification of the real-world objects with a glimpse of an eye. Calculating the surface areas as explained in detail about, all running through the origin of the coordinate system of the display 1 and thus through the reference point of the display 1, results in scaling the dimensions of the real-world objects on the edge of the display 1 which is intuitively recognized as the boundary between the "virtual world" and the "real world" using the indicator bars.

The invention claimed is:

1. A method for assisting a user of an assistance system including at least one sensor to sense an environment of a vehicle, a processor, and a display mounted on the vehicle to display representations of one or more objects in the environment of the display, comprising the following method steps:

obtaining, from the at least one sensor, information on an environment of the display including a lane on which the vehicle is driving;

determining, by the processor, presence of objects in the environment;

displaying, on the display, a representation of the environment including the vehicle, the lane, and the objects determined, by the processor, in the environment, wherein real-world positions of the vehicle, the objects, and the lane are converted into a coordinate system of the display;

determining, by the processor, for at least one of the objects represented in the representation of the environment, a starting point for an indicator line from a direction of the at least one object relative to the display, wherein the processor determines the starting point by calculating, as the starting point, a point of intersection between an outer edge of the display and a surface area, and wherein the surface area extends from a vertical axis y through a reference point of the display and includes a direction vector pointing from the reference point to a center of the at least one object for which the indicator line is to be displayed; and displaying, on the display, the indicator line connecting the starting point with the displayed representation of the at least one object, wherein for at least one determined and displayed object an indicator bar including the starting point is displayed along the outer edge of the display, wherein the indicator bar extends from an intersection point of the edge of the display and a first boundary surface area to an intersection point of the edge of the display and a second boundary surface area, and wherein the first boundary surface area extends from the vertical axis y through the reference point and includes a left direction vector pointing from the reference point towards a first outermost perceivable boundary of the determined object in the horizontal direction and the second boundary surface area extends from the vertical axis through the reference point and includes a direction vector pointing from the reference point towards an opposite, second outermost perceivable boundary of the determined object in the horizontal direction.

2. The method according to claim 1, wherein, in case of coincidence of the first boundary surface area of a first determined object and the second boundary surface area of a second determined object, directly adjacent indicator bars are displayed using distinguishable characteristics.

3. An assistance system for a vehicle comprising at least one sensor, a processor, and a display controlled by the processor, wherein the at least one sensor is configured to sense an environment of the vehicle, and wherein the processor is configured to:

obtain, from the at least one sensor, information on an environment of the display including a lane on which the vehicle is driving;

determine presence of objects in the environment of the display;

cause the display to display a representation of the environment including the vehicle, the lane, and the objects determined in the environment, wherein real-world positions of the vehicle, the objects, and the lane are converted into a coordinate system of the display;

determine, for at least one of the objects represented in the representation of the environment, a starting point for an indicator line from a direction of the at least one object relative to the display, wherein the processor determines the starting point by calculating, as the starting point, a point of intersection between an outer edge of the display and a surface area, and wherein the surface area extends from a vertical axis y through a reference point of the display and including includes a direction vector pointing from the reference point to a center of the at least one object for which the indicator line is to be displayed; and cause the display to display the indicator line connecting the starting point with the displayed representation of the at least one object, wherein for at least one determined and displayed object an indicator bar including the starting point is displayed along the outer edge of the display, wherein the indicator bar extends from an intersection point of the edge of the display and a first boundary surface area to an intersection point of the edge of the display and a second boundary surface area, and wherein the first boundary surface area extends from the vertical axis y through the reference point and includes a left direction vector pointing from the reference point towards a first outermost perceivable boundary of the determined object in the horizontal direction and the second boundary surface area extends from the vertical axis through the reference point and includes a direction vector pointing from the reference point towards an opposite, second outermost perceivable boundary of the determined object in the horizontal direction.

4. A vehicle comprising the assistance system according to claim 3.

* * * * *